United States Patent
Stehle et al.

(10) Patent No.: US 10,605,355 B2
(45) Date of Patent: Mar. 31, 2020

(54) TRANSMISSION CONTROL SYSTEM

(71) Applicant: ZF Friedrichshafen AG, Friedrichshafen (DE)

(72) Inventors: Harald Stehle, Tettnang (DE); Peter Schiele, Kressbronn (DE); Günther Maier, Meckenbeuren (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 0 days.

(21) Appl. No.: 16/250,108

(22) Filed: Jan. 17, 2019

(65) Prior Publication Data
US 2019/0219156 A1    Jul. 18, 2019

(30) Foreign Application Priority Data
Jan. 18, 2018    (DE) .................. 10 2018 200 775

(51) Int. Cl.
*F16H 61/02*    (2006.01)
*F16H 61/686*    (2006.01)
(Continued)

(52) U.S. Cl.
CPC ....... *F16H 61/0204* (2013.01); *F16H 61/686* (2013.01); *F16H 3/66* (2013.01);
(Continued)

(58) Field of Classification Search
CPC ............... F16H 59/42; F16H 2059/425; F16H 61/0204; F16H 61/0213; F16H 61/04; F16H 2061/0462
See application file for complete search history.

(56) References Cited

U.S. PATENT DOCUMENTS 6,081,760 A * 6/2000 Dreibholz ............... F16H 61/12
                                                                701/62
6,149,547 A 11/2000 Oba et al.
(Continued)

FOREIGN PATENT DOCUMENTS

DE    19917575 A1    10/2000
DE    102006002122 A1    7/2007
(Continued)

OTHER PUBLICATIONS

German Search Report DE102018200776.4 dated Oct. 4, 2018. (10 pages).
(Continued)

*Primary Examiner* — Edwin A Young
(74) *Attorney, Agent, or Firm* — Dority & Manning, P.A.

(57) ABSTRACT

A method (200) for the open-loop control of a gearbox (100) that comprises an input shaft (105) and a first and a second proportionally controllable shift element (A-F) is provided. The method includes disengaging (215) the first shift element (A-F) according to a first control profile and engaging (220) the second shift element (A-F) according to a second control profile. The method also includes cyclically performing the following during the disengagement and the engagement: determining (230) a difference between the rotational speed of the input shaft (105) and a rotational speed which the input shaft (105) assumes when the second shift element (A-F) has been completely engaged; determining (230) a gradient of the difference; and adapting (230) the first control profile on the basis of the gradient.

5 Claims, 4 Drawing Sheets

(51) Int. Cl.
*F16H 3/66* (2006.01)
*F16H 59/42* (2006.01)

(52) U.S. Cl.
CPC ...... *F16H 59/42* (2013.01); *F16H 2200/0065* (2013.01); *F16H 2200/2012* (2013.01); *F16H 2200/2041* (2013.01); *F16H 2200/2064* (2013.01); *F16H 2200/2094* (2013.01)

(56) References Cited

U.S. PATENT DOCUMENTS

| | | | |
|---|---|---|---|
| 8,868,307 B2 | 10/2014 | Jeon | |
| 2007/0167284 A1 | 7/2007 | Steinhauser et al. | |
| 2007/0207892 A1* | 9/2007 | Dreibholz | B60W 10/02 477/8 |
| 2008/0176710 A1* | 7/2008 | Nohara | F16H 61/061 477/156 |

FOREIGN PATENT DOCUMENTS

| | | |
|---|---|---|
| DE | 102011055926 A1 | 12/2012 |
| DE | 102012222366 A1 | 6/2014 |

OTHER PUBLICATIONS

German Search Report DE102018200777.2 dated Sep. 18, 2018. (10 pages).
German Search Report DE102018200779.9 dated Sep. 5, 2018. (10 pages).

\* cited by examiner

TRANSMISSION CONTROL SYSTEM

FIELD OF THE INVENTION

The present invention generally relates to a transmission control. In particular, the present invention relates to the open-loop control of a gearbox for use in a motor vehicle.

BACKGROUND

A motor vehicle includes a drive train which includes a prime mover or drive source, a gearbox, and a driving wheel. Different gear ratios are engagable in the gearbox in order to adapt a rotational speed of the prime mover to a rotational speed of the driving wheel. The gearbox includes multiple gear sets which may be differently configured and combined with the aid of shift elements. A control device controls the shift elements by way of an open-loop system and, in this way, determines which gear step is engaged, i.e., which step-down gear ratio (or step-up gear ratio) is present between an input side and an output side of the transmission, and determines with the aid of which gear sets in which configuration the step-down gear ratio is achieved. During a changeover from one gear into another gear, usually at least one shift element is disengaged and another shift element is engaged in order to achieve a changeover which is as smooth as possible.

The disengagement and engagement of the shift elements usually takes place according to a control profile which is determined before the open-loop control is carried out and is then statically implemented. This approach is also known as a controlled powershift. Under certain circumstances, within the scope of a gear step changeover, a deviation between the predetermined control profile and the arising extent of disengagement of a shift element controlled by way of an open-loop system may become so great that a comfortable gear step changeover cannot be carried out. Such circumstances may be present, for example, during a coasting gear shift accompanied by a strong brake application or during a load change between a traction load and a coast load during the gear change phase.

One problem addressed by the invention is that of providing an improved technique for the changeover of a gear ratio engaged in a gearbox.

SUMMARY OF THE INVENTION

A method for the open-loop control of a gearbox that includes an input shaft and a first and a second proportionally controllable shift element includes disengaging the first shift element according to a first control profile and engaging the second shift element of the gearbox according to a second control profile. The method also includes cyclically performing the following during the disengagement and the engagement: determining a difference between the rotational speed of the input shaft and a rotational speed which the input shaft assumes when the second shift element has been completely engaged; determining a gradient of the difference; and adapting the first control profile on the basis of the gradient, the difference, or both the gradient and the difference.

In contrast to existing approaches, in this way, a cyclic adaptation to an open-loop or closed-loop control deviation may be carried out. Preferably, the adaptation takes place periodically with a predetermined period or cycle time which, for example, may be a few ms or a few ten (10) ms. An existing open-loop control, which is based on a control profile which has been established in advance and does not change during the gear step changeover, may thus be expanded in an easy and effective way to include dynamic properties, and so a dynamic closed-loop control may be effectively carried out. Preferably, the control profiles for both shift elements are adapted on the basis of the gradient, the difference or both the gradient and the difference.

The control profile may be adapted, in particular, when a specification of a slip time of one of the shift elements changes. The slip time refers to the time during which one of the shift elements is in a slip condition, i.e., is neither in a completely disengaged condition nor in a completely engaged condition. If, for example, a downshift from a high gear step into a lower gear step takes place while the output shaft is decelerated, the slip time may be adapted if a change occurs to the braking force at the output shaft. In a motor vehicle, this may correspond to a downshift during a brake application, wherein the speed of the downshift is reduced when the intensity of the brake application diminishes. Due to the adaptation of the control profile if a change occurs to the specified slip time, the activation of the shift elements may be adapted, in an improved way, to a speed gradient of the output shaft.

The determination of the difference may be suspended when the gradient has not been reached at a predetermined point in the gear change phase. In this case, a previously determined gradient may continue to be utilized for the open-loop control of the shift elements. In this way, an existing open-loop control toward the target value determined on the basis of the gradient may be provided with the opportunity to adapt its control behavior to an existing deviation. A tendency of the closed-loop control to oscillate may be prevented in this way.

A deviation from a specified slip time may be determined when the slip time deviates from a specified slip time by more than a predetermined amount. Different amounts may be predetermined for a positive deviation and for a negative deviation. As a result, warning or fault thresholds outside the implementation of the predefined control values may be utilized. The control values may thus be provided in an improved way, regardless of their implementation.

A gearbox includes an input shaft and a first and a second proportionally controllable shift element. A device for the open-loop control of the gearbox includes a first interface for connection to the first shift element, a second interface for connection to a second shift element, and a processing unit. In this case, the processing unit is configured for disengaging the first shift element according to a first control profile and engaging the second shift element of the gearbox according to a second control profile and, moreover, for cyclically performing the following during the disengagement and the engagement: determining a difference between the rotational speed of the input shaft and a rotational speed which the input shaft assumes when the second shift element has been completely engaged; determining a gradient of the difference; and adapting the control profile on the basis of the gradient, the difference or both the gradient and the difference.

The device may be utilized for carrying out the method described herein. Advantages or features of the method may be transferred to the device, and vice versa.

BRIEF DESCRIPTION OF THE DRAWINGS

The invention will now be described more precisely with reference to the attached figures, in which.

DETAILED DESCRIPTION

Figure 1:
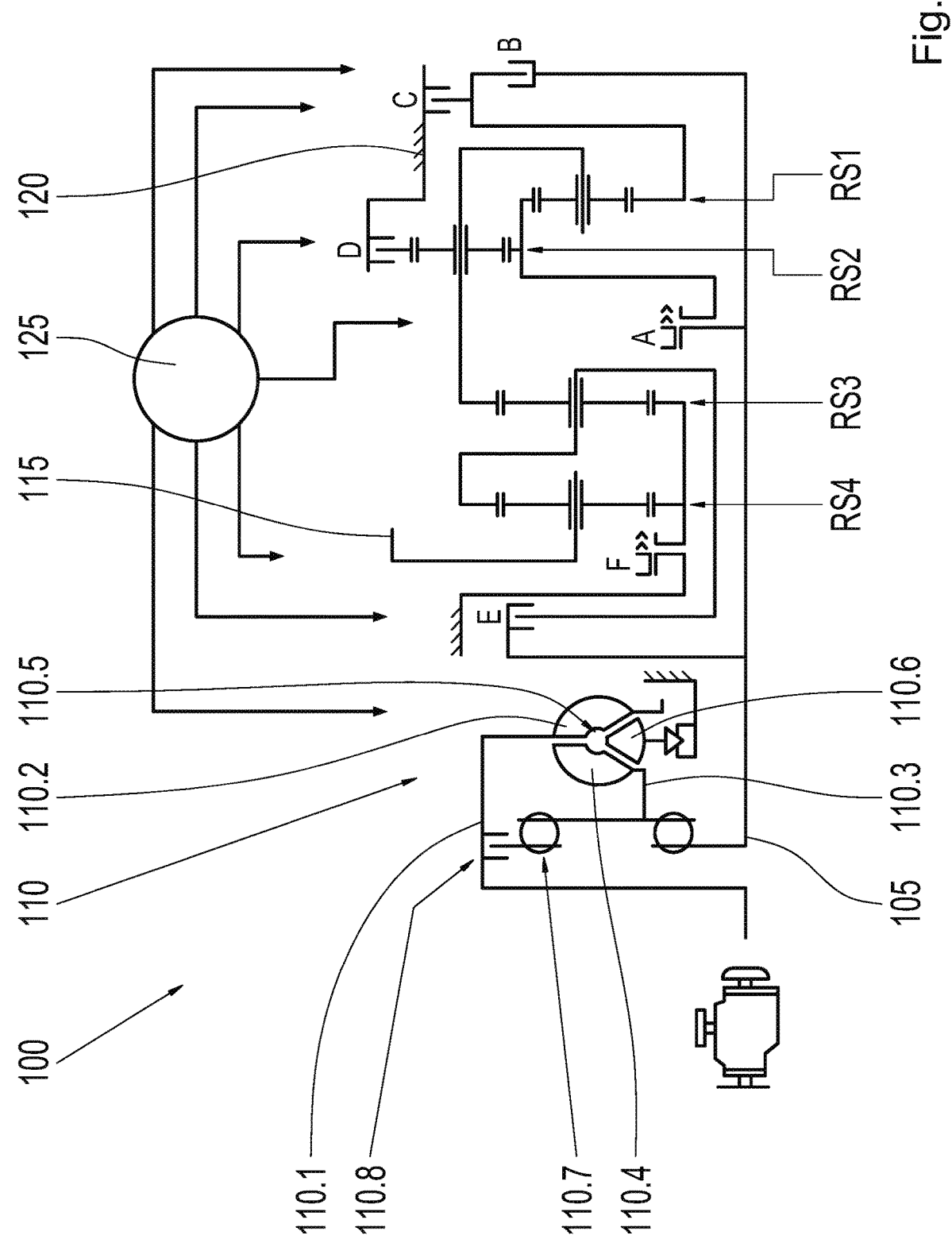
FIG. 1 shows a gearbox, for example, for use in a drive train of a motor vehicle.

Reference will now be made to embodiments of the invention, one or more examples of which are shown in the drawings. Each embodiment is provided by way of explanation of the invention, and not as a limitation of the invention. For example, features illustrated or described as part of one embodiment can be combined with another embodiment to yield still another embodiment. It is intended that the present invention include these and other modifications and variations to the embodiments described herein.

FIG. 1 shows a schematic of an exemplary gearbox 100 which is designed as a multi-stage planetary transmission. A changeover of a gear step or ratio engaged in the gearbox 100 is preferably hydraulically controllable. The present invention is described with reference to the represented gearbox 100, although the present invention may also be utilized on other types of transmissions which permit a controlled engagement or disengagement of a gear ratio.

The gearbox 100 is designed, by way of example, as a 9-speed transmission including one reverse gear and may preferably be utilized in a motor vehicle. The gearbox 100 includes four gear sets RS1 through RS4, each of which may be implemented as an epicyclic system, in particular, in the form of planetary gear trains. An input shaft 105 is configured for connection to a prime mover or drive source. Optionally, a hydrodynamic torque converter 110 is provided between the prime mover and the input shaft 105. The torque converter 110 may be designed to be integral with the gearbox 100 or may be encompassed by the gearbox 100. An output shaft 115 of the gearbox 100 is preferably configured for connection to a driving wheel of the motor vehicle in a torque-transmitting manner.

The hydrodynamic torque converter 110 includes an input side 110.1 which drives a pump 110.2, and an output side 110.3 which is driven by a turbine 110.4. The coupling takes place with the aid of a fluid 110.5 which flows between the pump 110.2 and the turbine 110.4. Preferably, a stator 110.6 is provided in order to direct and, if necessary, control the fluid flow. The torque converter 110 is provided, in particular, as a launch clutch and may bring about an increase in torque depending on a slip between the input side 110.1 and the output side 110.3. A vibration damper 110.7 may be connected to the output side 110.3 in order to reduce torsional vibrations in the torque path. The vibration damper 110.7 may also be provided when the torque converter 110 is dispensed with. Usually, a torque converter lockup clutch 110.8 is provided in order to set the rotational speed difference between the input side 110.1 and the output side 110.3 to zero and, in this way, to minimize flow losses in the torque converter 110, in particular at higher rotational speeds, i.e., after a starting operation.

The gear sets RS1 through RS4 are interconnected in the manner shown, by way of example. Each gear set includes three elements which engage into one another with the aid of tooth systems. The radially innermost element is also referred to as the sun gear, the outermost element is referred to as the ring gear, and the element located therebetween is also referred to as the planet gear. The planet gear is mounted so as to be rotatable with respect to a planet gear carrier which, for its part, is mounted so as to be rotatable about the same axis of rotation as the sun gear and the ring gear. In the representation from FIG. 1, the axis of rotation (not represented) extends horizontally along the input shaft 105. Parts of the gear sets RS1 through RS4 located axially symmetrically below the axis of rotation, as well as their shafts, are not represented. If one of the elements sun gear, planet gear carrier, or ring gear is held, in particular, by way of being braked with respect to a transmission housing 120, the other two elements may be utilized for coupling and decoupling torque, wherein a predetermined step-up or step-down ratio is achieved.

For the open-loop control of a torque flow through the gear sets RS1 through RS4, a total of six shift elements A through F are available in the represented embodiment, each of which may be activated to be disengaged or engaged. The shift elements C and D each operate between a rotary element and the transmission housing 120 and are also referred to as brakes. The shift elements A, B, E and F each operate between two rotary elements and are also referred to as clutches. At least one of the shift elements A through F is preferably configured for being capable of disconnecting or connecting, in a proportionally controllable manner, a torque connection between a completely disengaged position and a completely engaged position. For this purpose, friction elements may be provided, which are pressed axially against one another in order to establish a variable frictional connection. An axial contact force may be brought about, in particular, hydraulically, for the purpose of which, for example, an electronic pressure regulator may adjust a hydraulic control pressure according to a control signal in order to control the level of the torque transmission.

In the present embodiment, at least the shift elements B through E are proportionally controllable in terms of their transmission behavior. The shift elements A and F, in particular, may be designed as form-fit shift elements which may only be completely disengaged or completely engaged. The following table shows an exemplary shift pattern. For each gear step, shift elements A through F which are engaged in order to engage the gear step are marked with a dot. The other shift elements A through F are disengaged.

| Gear step | C | D | B | E | F | A |
|---|---|---|---|---|---|---|
| 1 |   | ● |   |   | ● | ● |
| 2 | ● |   |   |   | ● | ● |
| 3 |   |   | ● |   | ● | ● |
| 4 |   |   |   | ● | ● | ● |
| 5 |   |   | ● | ● |   | ● |
| 6 | ● |   |   | ● |   | ● |
| 7 |   | ● | ● | ● |   |   |
| 8 | ● | ● |   | ● |   |   |
| 9 |   | ● | ● | ● |   |   |
| R |   | ● | ● |   | ● |   |

A changeover from an engaged gear step to another gear step requires the disengagement of at least one engaged shift element A through F and the engagement of at least one disengaged shift element A through F.

If, for example, the second gear step is engaged in the gearbox, torque is transmitted from the input shaft 105 via the shift element A to the ring gear of the first gear set RS1. The sun gear of the first gear set RS1 is connected to the housing 120 via the shift element C. The shift element D is disengaged, and so the second gear set RS2 transmits no torque. The torque made available by the first gear set RS1 at the planet gear carrier of the first gear set RS1 is transmitted to the ring gear of the third gear set RS3. Sun gears of the third gear set RS3 and of the fourth gear set RS4 are connected to the housing 120 via the shift element F. Torque is coupled from the planet gear carrier of the third gear set RS3 into the ring gear of the fourth gear set RS4. The output shaft 115 is driven by the planet gear carrier of the fourth gear set RS4.

In order to now engage the third gear step, the shift element B is engaged and the shift element A is disengaged. The functions of the gear sets RS2 through RS4 remain unchanged. As in the second gear step, the first gear set RS1 is driven via the ring gear and torque is made available via the planet gear carrier. The sun gear is now connected via the shift elements A and B to the ring gear, however, and so the step-down ratio of the first gear set RS1 is set to one.

In order to ensure a high level of shifting comfort or a high shifting speed, the condition changes at the shift elements A through F must be more precisely matched to one another. During a gear step changeover, two gear steps are usually intermittently simultaneously engaged and transmit torque, wherein at least one of the shift elements A through F is in the slip condition.

A control device 125 is configured for appropriately disengaging and engaging the shift elements A through F and, in this way, engaging a desired gear step in the gearbox 100. The shift elements A through F are usually hydraulically actuated, wherein a disengagement or engagement force and a disengagement or engagement position of a shift element A through F depend on an applied hydraulic pressure. An electronic pressure regulator is usually assigned to each shift element A through F for the open-loop control of the hydraulic pressure. A pressure regulator converts a predefined, usually electrical signal into a corresponding hydraulic pressure and may operate in the manner of a proportional valve, a control valve, or servo-valve. The control device 125 operates preferably electrically and may include a programmable microcomputer or microcontroller. A signal made available at an electronic pressure regulator may be present as a pulse-width modulated (PWM) signal.

The control device 125 determines control signals to be set for the shift elements A through F usually with respect to an event, the time, or a transmission parameter which may be sampled with the aid of a suitable sensor. Transmission parameters may include, for example, rotational speeds at different points of the gearbox 100, a hydraulic pressure, a torque to be made available or to be transmitted, a temperature, or a position of a shift element A through F. An event may be derived from one sampled parameter or from a combination of multiple sampled parameters. For example, it may be determined that a synchronization point is no longer met when a slip sets in at a shift element A through F and the friction elements have different rotational speeds. The fact that the synchronization point is no longer met may also be determined on the basis of a ratio of rotational speeds of the input shaft 105 with respect to the output shaft 110. If the ratio does not match a predetermined reduction ratio of a gear step, the synchronization point of this gear step is not met. An event may also be determined with reference to an external parameter, for example, when a signal regarding a changed driver demand, a changed operation of the prime mover, or a change in the drive train between the output shaft 115 and a driving wheel is acquired.

The processing unit 125 may predefine the hydraulic control pressure to be set for a shift element A through F in the form of a curve over time, which is also referred to as a control profile or gradient. For a predetermined sequence in the gearbox 100, for example, the changeover from the third gear step into the second gear step, multiple profiles, which are matched to each other, for the shift elements A through F are usually determined and made available. A changeover of the gear step may require a time of approximately a quarter (¼) second or less. Under certain circumstances, however, a changeover of the gear step may be extended for a longer time. A control profile may be composed of multiple portions which may be additively combined with one another. A portion may be static, in part or completely, when the control profile is dependent only on time and not on an event or a parameter. A portion may also be dynamic when there is a dependency on an event or a parameter. In this case, the control profile may be determined or changed while the control profile is already being utilized for the open-loop control of a shift element A through F. For example, a first portion may ensure the desired functionality in the first approximation, a second portion may represent a refinement, such as an increase in comfort, and a third portion may implement a further optimization in a special case, for example, during downshifting accompanied by a brake application at a driving wheel.

In order to assist the changeover of the engaged gear step, a demand may also be transmitted to the prime mover connected to the input shaft 105, to limit the torque provided by the prime mover to a predetermined value.

Figure 2:
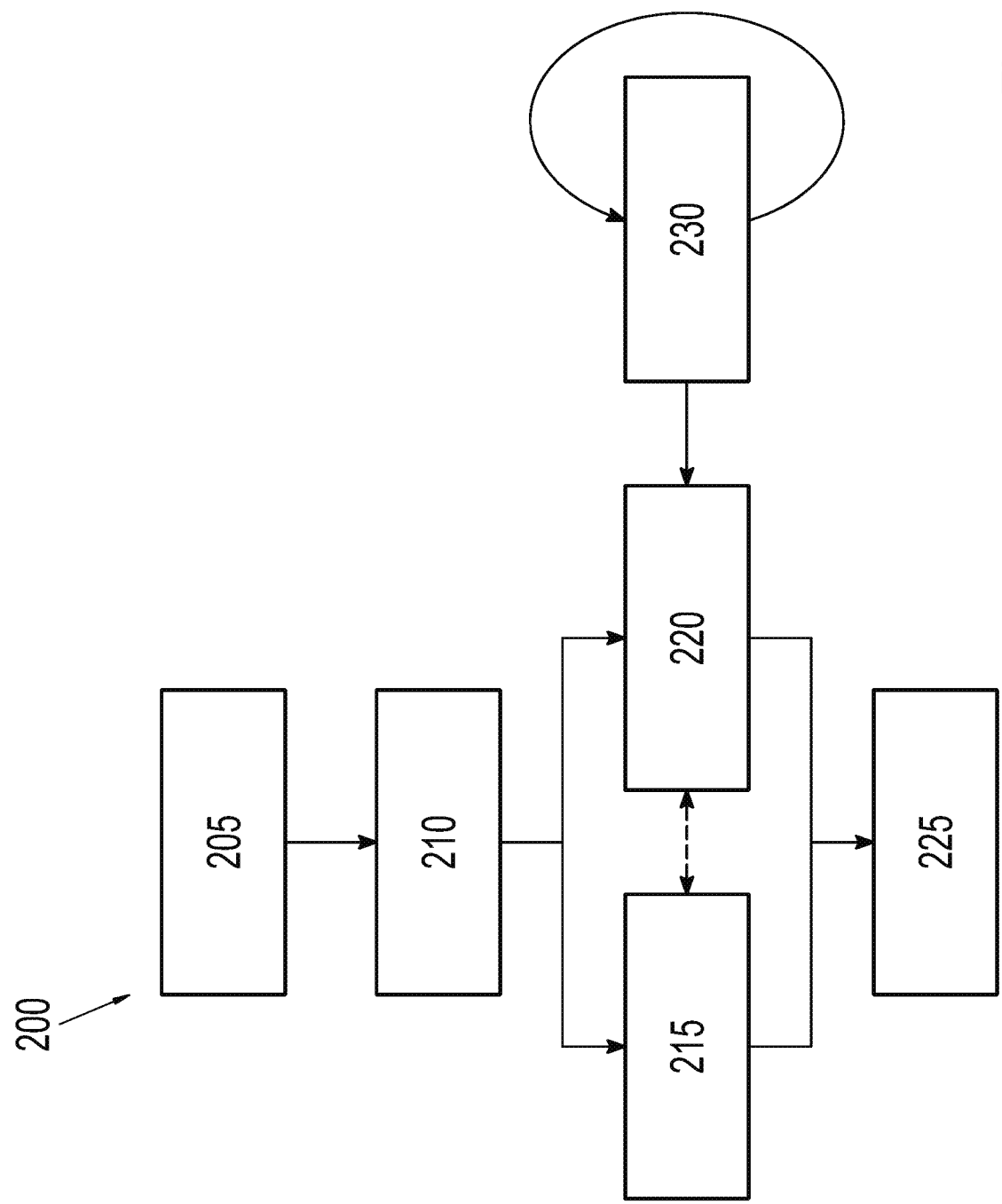
FIG. 2 shows a flow chart of a method for the open-loop control of a gearbox.

FIG. 2 shows a flow chart of a method 200 for the open-loop control of a gearbox 100. The method 200 is configured, in particular, for execution on the control device 125 and may be present as a computer program product including program code for the open-loop control of the gearbox 100.

The method 200 begins at 205. In response to a predetermined event, a changeover of a gear step engaged in the gearbox 100 is demanded. At 210, shift elements A through F involved in the changeover, and respective associated pressure regulators, may be determined. Usually, only one shift element A through F must be disengaged and only one other shift element A through F must be engaged. Multiple shift elements A through F may also be involved in the gear step changeover, however.

Thereafter, at 215, a first control profile for a shift element A through F to be disengaged is determined and the shift element A through F is activated according to the determined first control profile. Multiple time-dependent portions may be determined in this case, which may be additively combined to form the first profile. Usually, at least one of the portions is dependent on at least one parameter or event during 215, and so the first control profile may be determined or changed during the activation of the shift element A through F. Correspondingly, at 220, a second control profile for a shift element A through F to be engaged is determined and the shift element A through F is activated according to the determined second control profile. 215 and 220 may influence one another, for example, in that an event, which is triggered by the disengagement of a shift element A through F at 220, changes the determination of the first profile at 215.

As soon as the control profiles have been completely determined and activated, and so the predetermined shift elements A through F have been completely disengaged or engaged, the gear step changeover is concluded and the method 200 may terminate at 225.

It is provided that at least one of the gear change profiles for the first and the second shift elements A through F is determined at the beginning of 215, 220 and is cyclically renewed, at 230, during the execution of 215, 220. 230 may be executed concurrently with the rest of the method 200 and dynamically adapt an objective of a known open-loop control.

In particular, it is provided, within the scope of 230, that a difference nd_syn_soll between the rotational speed of the input shaft 105 and a synchronous speed of a gear step to be engaged is determined. The synchronous speed has been reached when a ratio of the rotational speed of the input shaft 105 with respect to the rotational speed of the output shaft 110 of the gearbox 100 corresponds to the reduction ratio of the gear step to be engaged, i.e., the gear step which is engaged when the second shift element A through F has been completely engaged. In other words, the synchronous speed may be determined on the basis of the predetermined step-down ratio of the gear step to be engaged and the rotational speed of the output shaft 110.

The difference of the rotational speeds may be differentiated with respect to time in order to determine a gradient w_ngdsyn_gls of the difference. The control profile may then be adapted on the basis of the gradient. In particular, a new control value w_ngdsyn_gls-ng_tgls may be predefined.

In 230, certain determining factors may be checked. For example, it may be determined whether a predetermined gradient was missed by more than a predetermined amount. A positive deviation and a negative deviation may be determined on the basis of separate amounts. Moreover, it may be determined whether a slip time w_tsgls of the shift element A through F corresponds to a predetermined slip time, or not. The slip time indicates a time interval in which the shift element A through F is in or should be in a slip condition. In the event of a rapid gear step changeover, for example, during a strong acceleration of the output shaft 110, the slip time may be short. During a slow deceleration of the output shaft 110, however, the slip time may be longer. A typical slip time may be in the range from approximately four hundred (400) ms to eight hundred (800) ms.

If a predetermined gradient is missed by more than a predetermined amount at a predetermined point of the gear step changeover, the redetermination or updating of the control profile may be suspended. The most recently predefined control profile may then be maintained for a predetermined time or a predetermined number of iterations of 230.

On the part of 215 or 220, a factoring of a control parameter may be introduced depending on a closed-loop control deviation in order to be able to replace the specified-value gradient correction over the medium-term. In other words, the extent of a deviation of a control parameter from the specified value of the control parameter may determine a factor, with the aid of which an attempt is made to minimize the deviation.

Figure 3:
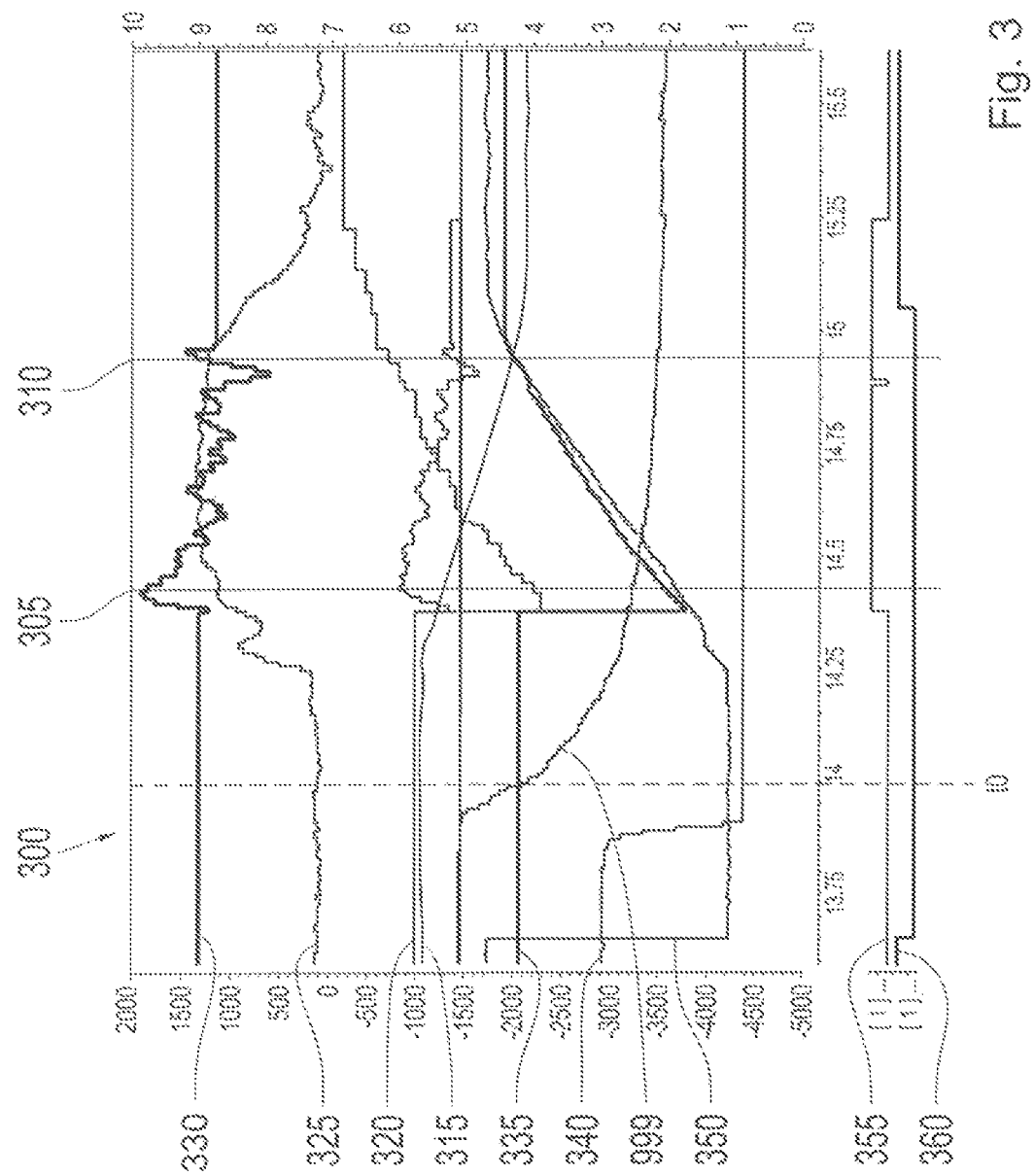
FIG. 3 shows exemplary profiles with respect to a gearbox during the changeover of an engaged gear step.

FIG. 3 shows exemplary profiles 300 of parameters of a gearbox 100. Curves over time are graphically represented in a range on the left. Absolute values of variables of the gearbox 100 at a first point in time 305 and at a second point in time 310 are expressed numerically in a range on the right. The represented values were determined on a real, exemplary gearbox 100 during an upshift, which was also exemplary, from a second gear step into a third gear step during a simultaneous load reduction.

The plotted profiles which are shown are an actual rotational speed 315 of the input shaft 105, a specified slip time 320, a control profile 320 for an actuator of a shift element A through F, a measured gradient 325 of a differential speed between the rotational speed of the input shaft 105 and the synchronous speed for the gear step to be engaged, as well as a gradient 330 of a differential speed derived from nd_syn_soll, and a specified rotational speed 335. Additionally, a throttle-position gradient 340, a transmitted torque 999, and an actual differential speed 350 with respect to the synchronous speed of the gear step to be engaged are indicated.

Exemplary time-dependent conditions are plotted in a lower area of FIG. 3. A first condition 355 indicates, by way of a high potential, that the differential speed is determined in 230, or, by way of a low potential, that a redetermination does not take place. A second condition 360 indicates, by way of a high potential, that the rotational speed of the input shaft 105 has reached the synchronous speed, or, by way of a low potential, that this is not the case.

Figure 4:
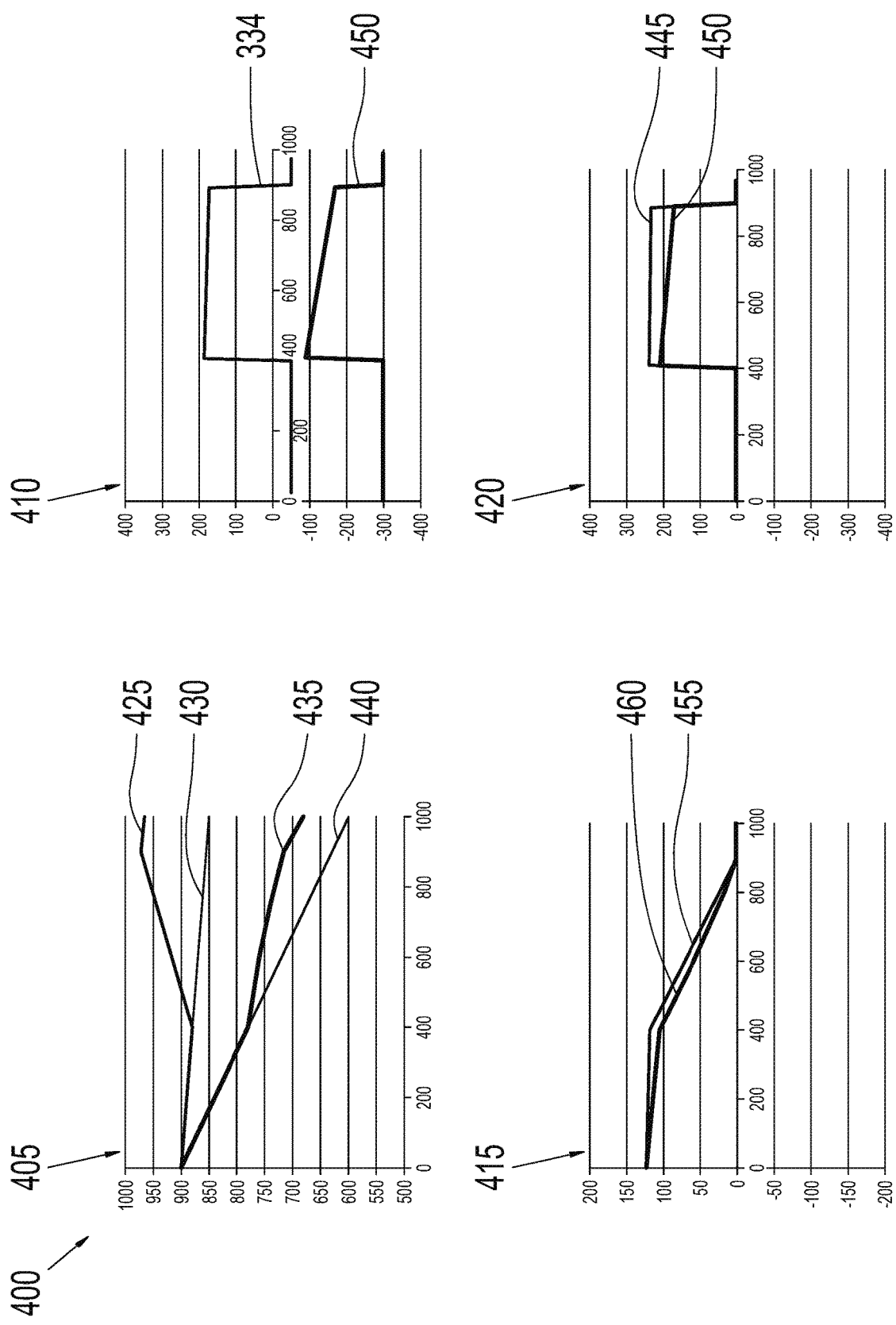
FIG. 4 shows further exemplary profiles.

FIG. 4 shows further exemplary profiles 400 with respect to a gearbox 100. A first representation 405 shows predetermined profiles. A second representation 410 shows time derivatives of profiles of the first representation 405. A third representation 415 includes further profiles, and a fourth representation 420 shows time derivatives of profiles of the third representation 415.

Profiles in the first representation 405 include a rotational speed 425 n_t_ungebremst of the input shaft 105, a rotational speed 430 n_ab_gebremst of the output shaft 110, a rotational speed 435 n_t_gebremst of the input shaft 105 during a brake application, and a rotational speed 440 n_ab_gebremst during a brake application.

Plotted in the second representation 410 are a gradient 334 ng_t_ungebremst of the rotational speed of the output shaft 110 without a brake application and a gradient 450 ng_t_gebremst of the rotational speed of the input shaft 105 with a brake application.

Plotted in the third representation 415 are a differential speed 455 nd_syn_ungebremst with respect to the synchronous speed without a brake application and a differential speed 460 nd_syn_gebremst with respect to the synchronous speed with a brake application.

Plotted in the fourth representation 420 are a gradient 445 ng_dsynzielgang_ungebremst of the synchronous speed of the gear step to be engaged, without a brake application, and a gradient 450 ng_dsynzielgang_ungebremst of the synchronous speed of the gear step to be engaged, with a brake application.

The descriptions utilized for the represented signals include the component '_t' for the case in which the signal relates to the input shaft 105 or the turbine 110.4 connected thereto, or the component '_ab' for the case in which the signal relates to the input shaft 110, or the component '_nd_syn' for the case in which the signal relates to the synchronous speed of the gear step to be engaged.

On the basis of the represented profiles, it becomes clear that profiles and gradients of rotational speeds with respect to the gearbox 100 may be very different, depending on whether braking is carried out or not during a gear step changeover from a high gear step into a low gear step. The brake application usually operates, in a motor vehicle, on a driving wheel and, in a drive train connected thereto, ultimately on the input shaft 110 of the gearbox 100. The stronger the brake application is, the greater the differences of the represented profiles and gradients are. The technique provided herein may implement the gear step changeover organically and smoothly, regardless of the intensity of the brake application. The change of a braking force during a gear step changeover may also be compensated for in an improved manner.

Modifications and variations can be made to the embodiments illustrated or described herein without departing from the scope and spirit of the invention as set forth in the appended claims.

REFERENCE CHARACTERS 100 gearbox
105 input shaft
110 hydrodynamic torque converter
110.1 input side
110.2 pump
110.3 output side
110.4 turbine
110.5 fluid
110.6 stator
110.7 vibration damper
110.8 torque converter lockup clutch
115 output shaft
120 transmission housing
A-F shift element
200 method
205 start
210 determine first and second shift elements
215 determine profile for disengaging the first shift element
220 determine profile for engaging the second shift element
225 end
230 cyclically update specified value
300 profiles
305 first point in time
310 second point in time
315 actual rotation speed of input shaft
320 control profile
325 measured differential speed gradient
330 differential speed gradient derived from nd_syn_soll
335 specified rotational speed
340 throttle-position gradient
999 transmitted torque
350 actual differential speed
355 differential speed is determined
360 synchronous speed has been reached
400 profiles
405 first representation
410 second representation
415 third representation
420 fourth representation
425 rotational speed of the input shaft rotational speed without a brake application
430 rotational speed of the output shaft rotational speed without a brake application
435 rotational speed of the input shaft rotational speed with a brake application
440 rotational speed of the output shaft rotational speed with a brake application
445 differential speed with respect to the synchronous speed without a brake application
450 differential speed with respect to the synchronous speed with a brake application
455 gradient of the output shaft rotational speed without a brake application
460 gradient of the output shaft rotational speed with a brake application
465 gradient of the synchronous speed without a brake application
470 gradient of the synchronous speed with a brake application

The invention claimed is:

1. A method (200) for the open-loop control of a gearbox (100) that includes an input shaft (105), a first proportionally controllable shift element (A-F) and a second proportionally controllable shift element (A-F), the method (200) comprising:
 disengaging (215) the first shift element (A-F) of the gearbox (100) according to a first control profile;
 engaging (220) the second shift element (A-F) of the gearbox (100) according to a second control profile; and
 cyclically performing the following during the disengagement of the first shift element (A-F) and the engagement of the second shift element (A-F),
  determining (230) a difference between the rotational speed of the input shaft (105) and a rotational speed which the input shaft assumes when the second shift element (A-F) has been completely engaged,
  determining (230) a gradient of the difference, and
  adapting (230) the first control profile on the basis of the gradient.

2. The method (200) of claim 1, wherein adapting (230) the first control profile comprises adapting (230) the first control profile on the basis of the gradient when a specification of a slip time of one of the first and second shift elements (A-F) changes.

3. The method (200) of claim 1, further comprising suspending the determination (230) of the difference when the gradient has not been reached at a predetermined point in a gear ratio change.

4. The method (200) of claim 1, further comprising determining a deviation from a specified slip time when a slip time deviates from the specified slip time by more than a predetermined amount.

5. A device (125) for open-loop control of a gearbox (100) that includes an input shaft (105), a first proportionally controllable shift element (A-F) and a second proportionally controllable shift element (A-F), the device (125) comprising:
 a first interface for connection to the first shift element (A-F);
 a second interface for connection to the second shift element (A-F);
 a processing unit (125); and
 a memory storing computer-executable instructions that, when executed by the processing unit (125), cause the processing unit (125) to perform operations comprising
  disengaging the first shift element (A-F) of the gearbox (100) according to a first control profile,
  engaging the second shift element (A-F) of the gearbox (100) according to a second control profile, and
  cyclically performing the following during the disengagement of the first shift element (A-F) and the engagement of the second shift element (A-F),
   determining (230) a difference between a rotational speed of the input shaft (105) and a rotational speed which the input shaft (105) assumes when the second shift element (A-F) has been completely engaged,
   determining (230) a gradient of the difference, and
   adapting (230) the first control profile on the basis of the gradient.

* * * * *